(12) United States Patent
Welle et al.

(10) Patent No.: US 12,504,312 B2
(45) Date of Patent: Dec. 23, 2025

(54) AUTONOMOUS SENSOR DEVICE AND EXPANSION MODULE

(71) Applicant: VEGA GRIESHABER KG, Wolfach (DE)

(72) Inventors: Roland Welle, Hausach (DE); Joerg Boersig, Oberwolfach (DE); Steffen Waelde, Niedereschach (DE)

(73) Assignee: VEGA GRIESHABER KG, Wolfach (DE)

( * ) Notice: Subject to any disclaimer, the term of this patent is extended or adjusted under 35 U.S.C. 154(b) by 543 days.

(21) Appl. No.: 17/786,112

(22) PCT Filed: Dec. 20, 2019

(86) PCT No.: PCT/EP2019/086736
§ 371 (c)(1),
(2) Date: Jun. 16, 2022

(87) PCT Pub. No.: WO2021/121629
PCT Pub. Date: Jun. 24, 2021

(65) Prior Publication Data
US 2023/0025839 A1  Jan. 26, 2023

(51) Int. Cl.
*G01F 23/80* (2022.01)
*H05K 5/06* (2006.01)
*H05K 5/30* (2025.01)

(52) U.S. Cl.
CPC ........... *G01F 23/802* (2022.01); *H05K 5/069* (2013.01); *H05K 5/30* (2025.01)

(58) Field of Classification Search
CPC ..... G01F 23/802; G01F 23/00; H05K 5/0021; H05K 5/069
See application file for complete search history.

(56) References Cited

U.S. PATENT DOCUMENTS

| | | | |
|---|---|---|---|
| 7,005,778 B2 | 2/2006 | Pistor | |
| 7,150,639 B2 * | 12/2006 | Fehrenbach | G01D 11/24 439/151 |

(Continued)

FOREIGN PATENT DOCUMENTS

| | | |
|---|---|---|
| CN | 101128146 A | 2/2008 |
| CN | 206975817 U | 2/2018 |

(Continued)

OTHER PUBLICATIONS

English translation of International Preliminary Report on Patentability and Written Opinion issued Jun. 30, 2022 in PCT/EP2019/086736, 10 pages.

(Continued)

*Primary Examiner* — Shelby A Turner
*Assistant Examiner* — Yaritza H Perez Bermudez
(74) *Attorney, Agent, or Firm* — Oblon, McClelland, Maier & Neustadt, L.L.P.

(57) ABSTRACT

A base sensor for process variable determination in an industrial environment. The base sensor includes first wireless communication circuitry that transmits signals to a first expansion device and/or receives signals from the first expansion device, and a first housing including a first receiving device that receives the first expansion device or a second housing, the first housing completely enclosing the base sensor.

16 Claims, 4 Drawing Sheets

(56) References Cited

U.S. PATENT DOCUMENTS

| | | | |
|---|---|---|---|
| 8,531,047 B2 | 9/2013 | Schmidt et al. | |
| 8,615,374 B1* | 12/2013 | Discenzo | G06F 15/00 |
| | | | 340/521 |
| 9,674,323 B1 | 6/2017 | Yu et al. | |
| 10,302,501 B2 | 5/2019 | Lysen et al. | |
| 10,352,972 B1 | 7/2019 | Nayak | |
| 10,436,916 B2 | 10/2019 | Freiburger et al. | |
| 12,039,854 B2* | 7/2024 | Miller | B01D 46/0086 |
| 2001/0043062 A1* | 11/2001 | Reid | G01R 22/065 |
| | | | 324/117 R |
| 2005/0035600 A1 | 2/2005 | Albsmeier et al. | |
| 2008/0161659 A1 | 7/2008 | Reichenberger et al. | |
| 2008/0211664 A1 | 9/2008 | Griech et al. | |
| 2009/0307405 A1* | 12/2009 | Ottliczky | F15B 13/0853 |
| | | | 710/305 |
| 2012/0290268 A1* | 11/2012 | Bey | G01F 1/6845 |
| | | | 702/189 |
| 2014/0208876 A1* | 7/2014 | Mattingly | G01D 11/30 |
| | | | 29/25.35 |
| 2014/0278144 A1* | 9/2014 | Risk | G01D 18/008 |
| | | | 702/24 |
| 2014/0278257 A1 | 9/2014 | Vandervalk | |
| 2014/0336988 A1 | 11/2014 | Welle et al. | |
| 2015/0181741 A1* | 6/2015 | Stagg | G08B 25/08 |
| | | | 361/731 |
| 2016/0123861 A1 | 5/2016 | Scheibelmasser et al. | |
| 2016/0305797 A1* | 10/2016 | Pietrasik | H04W 4/80 |
| 2017/0181223 A1 | 6/2017 | Sur et al. | |
| 2017/0316683 A1* | 11/2017 | Pietrasik | G01D 11/245 |
| 2018/0203135 A1 | 7/2018 | Freiburger et al. | |
| 2019/0195717 A1 | 6/2019 | Jagiella | |
| 2019/0250019 A1 | 8/2019 | Allgaier et al. | |
| 2020/0244103 A1* | 7/2020 | Paul | G01D 21/00 |
| 2021/0318159 A1 | 10/2021 | Dieterle et al. | |
| 2024/0077843 A1 | 3/2024 | Fernandes Lima et al. | |

FOREIGN PATENT DOCUMENTS

| | | |
|---|---|---|
| CN | 206990058 U | 2/2018 |
| CN | 108027598 A | 5/2018 |
| DE | 101 03 952 A1 | 10/2002 |
| DE | 101 25 059 A1 | 12/2002 |
| DE | 20 2005 015 791 U1 | 1/2006 |
| DE | 10 2007 030 055 A1 | 1/2009 |
| DE | 10 2009 028 794 A1 | 2/2011 |
| DE | 20 2012 100 385 U1 | 3/2013 |
| DE | 10 2014 108 527 A1 | 12/2015 |
| DE | 10 2014 217 706 A1 | 3/2016 |
| DE | 10 2015 112 536 A1 | 2/2017 |
| DE | 10 2016 212 264 A1 | 1/2018 |
| DE | 10 2017 123 821 A1 | 4/2019 |
| EP | 2 803 956 A1 | 11/2014 |
| EP | 3 015 847 A1 | 5/2016 |
| EP | 3 349 047 A1 | 7/2018 |
| EP | 3 605 031 A1 | 2/2020 |
| WO | WO 2004/017026 A1 | 2/2004 |
| WO | WO 2005/103851 A1 | 11/2005 |
| WO | WO 2016/131025 A1 | 8/2016 |
| WO | WO 2017/103887 A1 | 6/2017 |

OTHER PUBLICATIONS

European Office Action issued Jun. 19, 2023 in European Application 19 835 405.2, 7 pages.
International Search Report issued Sep. 11, 2020 in PCT/EP2019/086736 filed on Dec. 20, 2019, 2 pages.
Chinese Office Action issued on Feb. 23, 2024 in application 201980103450.4 filed on Dec. 20, 2019, 7 pgs.
German Office Action issued Oct. 7, 2020 in German Patent Application No. 10 2019 220 448.1, 9 pages.
German Office Action issued Sep. 1, 2020 in German Patent Application No. 10 2019 220 432.5, 4 pages.
International Search Report and Written Opinion issued Sep. 17, 2020 in PCT/EP2019/086707 (with English translation), 22 pages.
International Search Report and Written Opinion issued Sep. 11, 2020 in PCT/EP2019/086736 (with English translation), 24 pages.
Office Action dated Jun. 26, 2025, issued in counterpart CN Application No. 201980102856.0, with English Translation, (pages).

* cited by examiner

AUTONOMOUS SENSOR DEVICE AND EXPANSION MODULE

FIELD OF INVENTION

The invention relates to a sensor device for process variable determination in an industrial environment, a sensor base unit, an expansion module for a sensor device, and the use of the expansion module for such a sensor device.

INVENTION BACKGROUND

For the acquisition of industrial process variables, e.g. in a chemical environment, it may be necessary for the sensor to be hermetically sealed for the acquisition of a process variable. Self-contained sensors can be used for this purpose. Since these are surrounded by a sealed housing, they cannot easily be equipped with new functionalities by, for example, installing additional hardware. Thus, for example, it is not possible to subsequently install a display and operating function, data storage or more powerful energy storage.

Accordingly, autonomously operating level sensors are developed on a customer-specific basis for a wide variety of customer requirements, resulting in a high number of sensor variants. In view of the resulting costs for development, approval, production and sales, this high number of different devices is a major disadvantage. In addition, the devices cannot be retrofitted with additional functions.

SUMMARY OF THE INVENTION

It is therefore an object of the invention to propose a concept and devices according to the invention adapted thereto, which eliminate the aforementioned disadvantages.

The object is solved by the objects of the independent patent claims. Advantageous embodiments are the subject of the dependent claims, the following description, and the figures.

According to a first aspect, a sensor base unit for process variable determination in an industrial environment is provided. The sensor base unit comprises a first wireless communication unit configured to transmit signals to a first expansion module and/or receive signals from a first expansion module, and a first housing comprising a first receiving device configured to receive the first expansion module or a second housing, wherein the first housing completely encloses the sensor base unit.

The term "process automation in the industrial environment" may be understood as a subfield of technology that includes all measures for the operation of machines and plants without the involvement of humans. One goal of process automation is to automate the interaction of individual components of a plant in the chemical, food, pharmaceutical, petroleum, paper, cement, shipping or mining industries. For this purpose, a variety of sensors can be used, which are especially adapted to the specific requirements of the process industry, such as mechanical stability, insensitivity to contamination, extreme temperatures and extreme pressures. Measured values from these sensors are usually transmitted to a control room, where process parameters such as level, limit level, flow rate, pressure or density can be monitored and settings for the entire plant can be changed manually or automatically.

A subfield of process automation in the industrial environment concerns logistics automation. With the help of distance and angle sensors, processes within a building or within an individual logistics facility are automated in the field of logistics automation. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and location of an object is required by the respective application side. Sensors based on optical measurement methods using lasers, LEDs, 2D cameras or 3D cameras that measure distances according to the time-of-flight (ToF) principle can be used for this purpose.

Another subfield of process automation in the industrial environment concerns factory/production automation. Use cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

"Sensor" means a device that has a sensing element in a housing for determining process variables, as well as the components present within the housing, such as electronic components, connectors, and mechanical elements.

The basic sensor unit is configured, for example, to determine a pressure, a level, a limit level or a density as a process variable.

The sensor base unit may thus be operated autonomously by the wireless communication unit and the wireless power transmission unit, despite a closed housing around the sensor base unit. Due to the closed housing, all functional parts of the sensor base unit are inside the housing, i.e. in particular also process size detection unit including e.g. the electronics and usually also an antenna or a measurement sensor. The extension module may provide one or more extensions, as explained in the embodiments below. Thus, the sensor base unit or sensor can be expanded in any modular fashion without interfering with the sensor base unit. Due to the fact that only a mechanical receptacle is provided for connecting the sensor base unit to the extension module, and no galvanic electrical connections with corresponding connecting devices, the assembly is very simple. A wire or plug connection, which may be subject to contamination, corrosion or deformation, is not necessary.

The mechanical mount features, for example, a thread, a snap, a click fastener, a magnetic assembly, or a hook and loop fastener. The thread can be, for example, an internal thread on a protruding edge of the housing, an external thread of the housing, or a central screw thread so that the expansion module can be screwed onto the housing of the sensor base unit.

According to an embodiment, the first housing hermetically encloses the sensor base unit so that no air or liquid can enter or escape. Especially in these cases, where the housing must be hermetically sealed, it is important to keep mechanical stresses at interfaces to the outside low or to avoid them, so that the tightness is maintained. The sensor base unit presented avoids such interfaces to the expansion module, i.e. cables, plugs, seals, etc., entirely.

According to an embodiment, the signals are measurement and/or control signals, and the first wireless communication unit is arranged to transmit and/or receive the signals in analog or digital form. Typically, analog measurement signals are generated by a process variable determination unit in the sensor base unit, which are pre-processed and converted into digital signals, and transmitted as digital data to the expansion module. Control, such as measurement cycle, possibly synchronization, configuration, retrieval of data, etc. For example, this is done by a control unit of an expansion module. The control unit can receive the information e.g. from outside. The data can be modulated onto a carrier, for example, according to a digital or analog modulation technique in accordance with a communication protocol. The communication protocol is preferably subject to a communication standard.

According to an embodiment, the sensor base unit has, as an alternative or in addition to the first wireless communication unit, a first wireless power transmission unit that is set up to transmit power to the expansion module and/or receive power from the expansion module. That is, power transmission is possible in both directions. Thus, the extension module can be a module without its own energy storage and can be supplied with energy by the sensor base unit, or vice versa. It is also possible, for example, to transmit energy in one direction at one time and in the other direction at another time, for example, depending on surplus or unneeded energy or on demand.

The housing does not need to be opened for energy transfer or data tapping, and no sealed cable interface needs to be provided. The sensor base unit can have its own energy storage, such as a battery, and supportively receive energy through an expansion module so that the battery is conserved and its life is extended. The optional energy storage can also be a rechargeable storage, or a storage that is only charged when energy is needed for a measurement or for a data transmission.

According to an embodiment, the first wireless energy transmission unit is set up to transmit and/or receive electrical energy inductively. Inductors may be considered, for example, coils, and the e.g. printed NFC antennas are also considered coils. Alternatively, the energy can be transmitted electroacoustically, for example, with the conversion from acoustic to electrical energy, or vice versa, taking place via a piezo, for example.

According to a second aspect, an expansion module for a sensor base unit for process variable determination in an industrial environment is provided. The expansion module comprises a second wireless communication unit adapted to transmit signals to and/or receive signals from the sensor base unit, and a second housing having a second receptacle configured to mate with the first receptacle so that the expansion module can be received by the sensor base unit, wherein the second housing completely encloses the expansion module.

The second aspect and parts of the embodiments describe the extension module as a counterpart to the sensor base unit. For example, the mechanical mount of the extension module to be received on the sensor base unit is the counterpart to the mechanical mount of the sensor base unit and is thus configured accordingly.

According to an embodiment, the second housing is adapted to hermetically close the expansion module. For example, the housing of the expansion module is designed mechanically and with respect to the material to be waterproof, dustproof and/or airtight. Both the sensor base unit and the extension module are thus designed to be self-sufficient, where self-sufficient can mean that the sensor base unit as well as the extension module are self-sufficient in themselves, or the combination of the sensor base unit with the extension module due to the wireless connections, whereby, for example, the energy is distributed in the combination.

According to a further embodiment, the signals that the second wireless communication unit of the expansion module sends and/or receives are measurement and/or control signals. Furthermore, the second wireless communication unit is set up to send and/or receive the signals in analog or digital form. The second wireless communication unit is thus designed to correspond to the first wireless communication unit of the sensor base unit with which the second wireless communication unit communicates.

According to an embodiment, the expansion module further comprises a second wireless power transmission unit configured to transmit power to the sensor base unit and/or receive power from the sensor base unit. Thus, the second wireless energy transmission unit corresponds to the first wireless energy transmission unit of the sensor base unit, which receives or transmits the energy from the second wireless energy transmission unit accordingly. The energy is, for example, an electrical energy or an acoustic energy, and the energy transmission unit is arranged to inductively or acoustically transmit and/or receive the electrical energy, according to one embodiment.

According to an embodiment, the second housing comprises a third receiving device arranged to receive a further expansion module. The third receiving device may be different from the first receiving device, but is preferably implemented in the same way, for example as a thread, a snap closure, a click closure, a magnetic arrangement or a Velcro closure. Through the third receiving device, another expansion module can be connected to the sensor base unit via the first expansion module. In this context, connected means that this expansion module, which also has at least one wireless communication unit and, if applicable, a wireless power transmission unit, can also send power and/or signals to the sensor base unit, or receive signals from it. Thus, any number of expansion modules can be mounted as a stack of expansion modules on the sensor base unit and connected to the sensor base unit with respect to power transmission and signal transmission. This enables a variable, modular configuration of the sensor. The extension modules can be set up here to communicate with each other and, for example, to provide energy for another extension module. An extension module can be a final module, i.e. a top module to which no further extension module can be connected, such as a display and control module, in which the display and control units must be accessible to a user.

As described below, the expansion modules may have different assemblies, components, interfaces, functionalities, etc. While specific embodiments are presented below, an expansion module may also have a combination of different module types of the following embodiments or parts thereof.

According to an embodiment, the expansion module is set up as an energy module that has at least one energy storage device. For example, the energy module contains one or more batteries as energy storage. Thus, the sensor base unit can be supplied with sufficient energy. The module may also include circuitry that detects that the energy supply is nearing depletion and an indicator that indicates this condition. If the sensor device further comprises an external communication unit, the status can be transmitted to a server or smartphone, for example, and the energy module can be easily replaced at the required time without having to open the sensor base unit and/or the energy module, and without having to remove the sensor base unit for maintenance. If the extension module is an intermediate module between the sensor base unit and a further extension module, the extension module may be configured to transfer energy to the further extension module. Further, the energy storage device may be a rechargeable energy storage device such that the extension module may receive, store, and release energy from the sensor base module or a further extension module.

According to an embodiment, the expansion module is set up as an external communication module and has a third communication unit. The external communication may, for example, be according to one or more of WLAN, 5G, Bluetooth, Zigbee, NB-IOT, GSM, CAT-M, LoRa, Sigfox or other protocols for data transmission. The communication unit may also support a wired connection, such as a fieldbus connection, and the expansion module may provide the corresponding hardware and software, such as also a corresponding connector or other connection.

According to an embodiment, the expansion module is set up as a service module and has a data memory and a memory processing unit. The memory processing unit is set up to store data received at the second communication unit and to manage the memory. Measurement data can thus be stored over a longer period of time. The data memory can be a built-in memory or a removable memory. In the case of a built-in memory, the memory can be transmitted, for example, via another wireless communication unit to a communication unit outside the expansion module, e.g., a server or a smartphone. The data can also be transferred, for example, to an expansion module set up as an external communication module to transfer the data, for example, to a network or a smartphone.

According to an embodiment, the extension module is set up as an adapter module and has an adapter unit that is set up to receive a wired sensor add-on module and to convert wireless communication with the sensor base unit and/or wireless power transmission from or to the sensor base unit into wired communication with the sensor base unit and/or wired power transmission from or to the sensor base unit. Thus, an existing sensor add-on module, which may have similar characteristics to the expansion modules presented herein, for example except for the housing, and which operates in a contactless manner, can simply be inserted into the expansion adapter, for example. Thus, by means of an expansion adapter, a common sensor module operating in a contactless manner can also be used if the sensor base unit does not have any contactless interfaces suitable for the sensor add-on module.

According to a further embodiment, the extension module is configured as a cable module and has an interface for wired external communication and/or external power supply. The cable module can thus be connected by wire to an external DC voltage or AC voltage source in order to thus provide energy for the sensor base unit or another expansion module.

According to a third aspect, there is provided a sensor device comprising a sensor base unit described above and an expansion module described above, wherein the expansion module is mounted on the sensor base unit.

Thus, virtually any number of expansion modules can be connected to the sensor base unit. This provides a sensor device for process variable determination with a sensor base unit, whereby the sensor device can be modularly expanded by one or more stackable expansion modules. According to one embodiment, the first extension module is attached to one side of the sensor base unit and is arranged to receive the second extension module as a final extension module or stacking further extension modules. For example, the first extension module is attached to the top of the sensor base unit and the second extension module is attached to the top of the first extension module, building up a stack of extension modules extending perpendicular to the surface of the sensor base unit. In this case, the communication interfaces of the first extension module are on opposite sides, e.g., top and bottom. If the extension modules are cylindrical, stacking the extension modules creates a cylindrical stack with a round cross-sectional area, in which the total height results from the height of the individual extension modules. The individual extension modules can have the same or different heights. A final extension module does not necessarily have to have two mechanical or communication interfaces. If the final extension module is, for example, a display and operating unit, another extension module would possibly hinder or prevent the reading of the display or the operation of the sensor device.

According to a further aspect, the expansion module is used for a sensor device.

Other types of extension modules include a sensor module in which the extension module may have an acceleration sensor, a pressure sensor, a geomagnetic field sensor, a gas sensor, a distance sensor, a brightness sensor, and/or a temperature sensor. Distance sensors such as lidar, radar, and ultrasound, as well as motion sensors and brightness sensors, are particularly suitable for use in the final expansion modules.

Other variations of the disclosed embodiments may be understood and carried out by those skilled in the art in carrying out the claimed invention by studying the drawings, the disclosure, and the appended claims. In the claims, the word "comprising" does not exclude other elements or steps, and the indefinite article "a" or "an" does not exclude a plurality. The mere fact that certain measures are recited in interdependent claims does not mean that a combination of those measures cannot be advantageously used. Reference signs in the claims should not be construed to limit the scope of the claims.

BRIEF DESCRIPTION OF THE FIGURES

In the following, embodiments of the invention are described in detail with reference to the accompanying figures. Neither the description nor the figures are to be construed as limiting the invention. Identical reference signs in different figures denote identical components, unless expressly described otherwise. Here shows FIG. 1 diagram of a stand-alone sensor, FIG. 2 diagram of a sensor with integrated local display, FIG. 3 diagram of a sensor with a photovoltaic module, FIG. 4 diagram a sensor device with a sensor base unit and an expansion module, FIG. 5 Diagrams of various embodiments of expansion modules, FIG. 6 diagram a mechanical mount for an expansion module with an angle indicator unit, FIG. 7 diagram showing a sensor base unit and a stack of expansion modules.

DETAILED DESCRIPTION OF THE FIGURES

Figure 1:
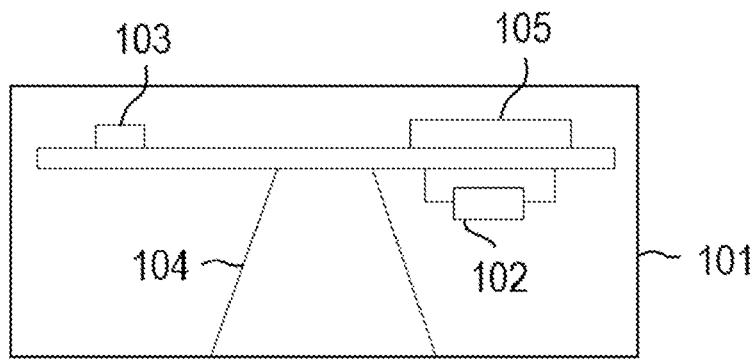
Figure 2:
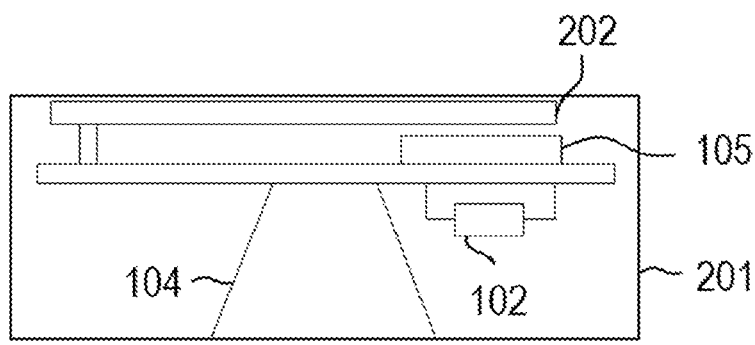
Figure 3:
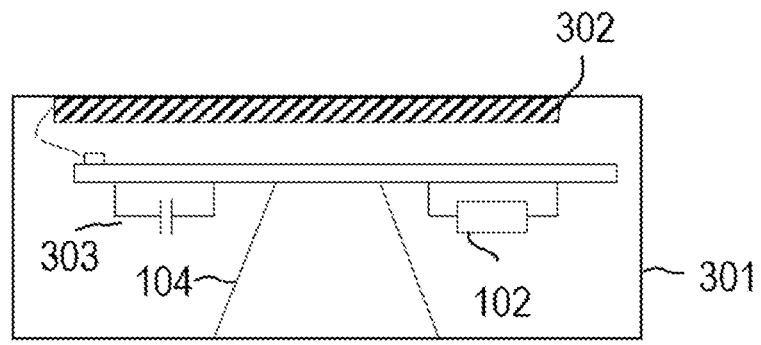

FIG. 1 to FIG. 3 show examples of typical sensors that cannot be retrofitted with additional functions.

FIG. 1 shows a sensor 101 comprising a battery 102, a wireless communication unit 103, and a level detection unit 104. For purposes of maintenance and on-site operation, the sensor 101 further comprises a near-field communication unit 105, for example an NFC unit or a Bluetooth unit. In the interaction of the illustrated components, a self-sufficient measuring system can be realized.

FIG. 2 shows an alternative embodiment of a sensor 201 with an integrated on-site display, for example an LCD—unit 202 or an e-paper unit 202 with an operating function. In this embodiment, the near-field communication unit 105 may also be omitted, since display and/or operation of the sensor is provided directly by means of the unit 202.

In the case of the sensors shown in FIG. 1 and FIG. 2, the complete sensor unit 101, 201 must be replaced and disposed of after the battery 102 is drained. FIG. 3 therefore shows a version of a sensor 301 extended by an energy harvesting option 302, for example a photovoltaic module 302. The sensor 301 is able to collect energy during sunny days and store it in the accumulator 303. During less sunny periods, this energy can then be used to maintain the measurement before the battery 302 must be used for measurement in the event of an energy deficit. Through this, the arrangement 301 can greatly increase the lifetime of the sensor. However, the manufacturing cost of the sensor 301 is significantly higher than that of the sensor 101.

Figure 4:
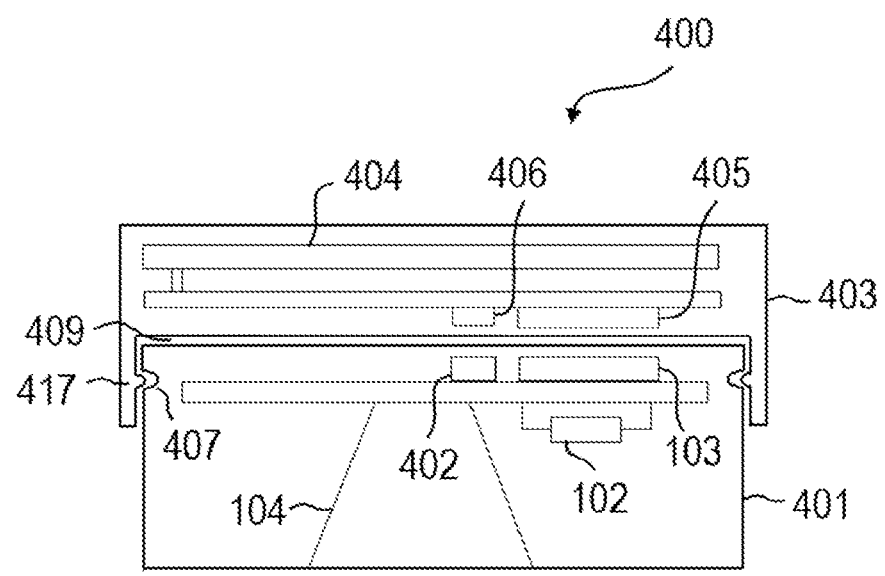

FIG. 4 shows an example of a level sensor 401 as a basic sensor unit 401, which essentially consists of the parts already shown in FIG. 1, i.e. battery 102, wireless communication unit 104 and level detection unit 104, which in interaction can realize a self-sufficient level measurement. However, the hermetically sealed housing of the sensor 401 has on its outside a mechanically formed receiving device 408 or contour 408 which is suitable for receiving an expansion module 403, in this case a display module 403 with a suitable contour 417. In one embodiment, the expansion module 403 is also of hermetically sealed construction, and thus protected in a simple manner against external influences. Wirelessly acting energy transmission units 103, 405 are used to exchange energy between the self-sufficient level sensor 401 and the expansion module 403. Typical units used at this point include, for example, inductively coupling units or RFID standards such as NFC. In addition, the sensor 401 and the expansion module 403 each have at least one wireless communication unit 402, 406, which are set up to exchange control commands and/or data. Applicable prior art standards include Bluetooth, Zigbee, RFID, NFC or even capacitive techniques for bidirectional coupling or even optical methods.

In the example of FIG. 4, the presented ensemble of stand-alone level sensor 401 and extension module 403 makes it possible to equip a standard sensor 401 with an additional display 404 at a later date or already ex works.

Figure 5:
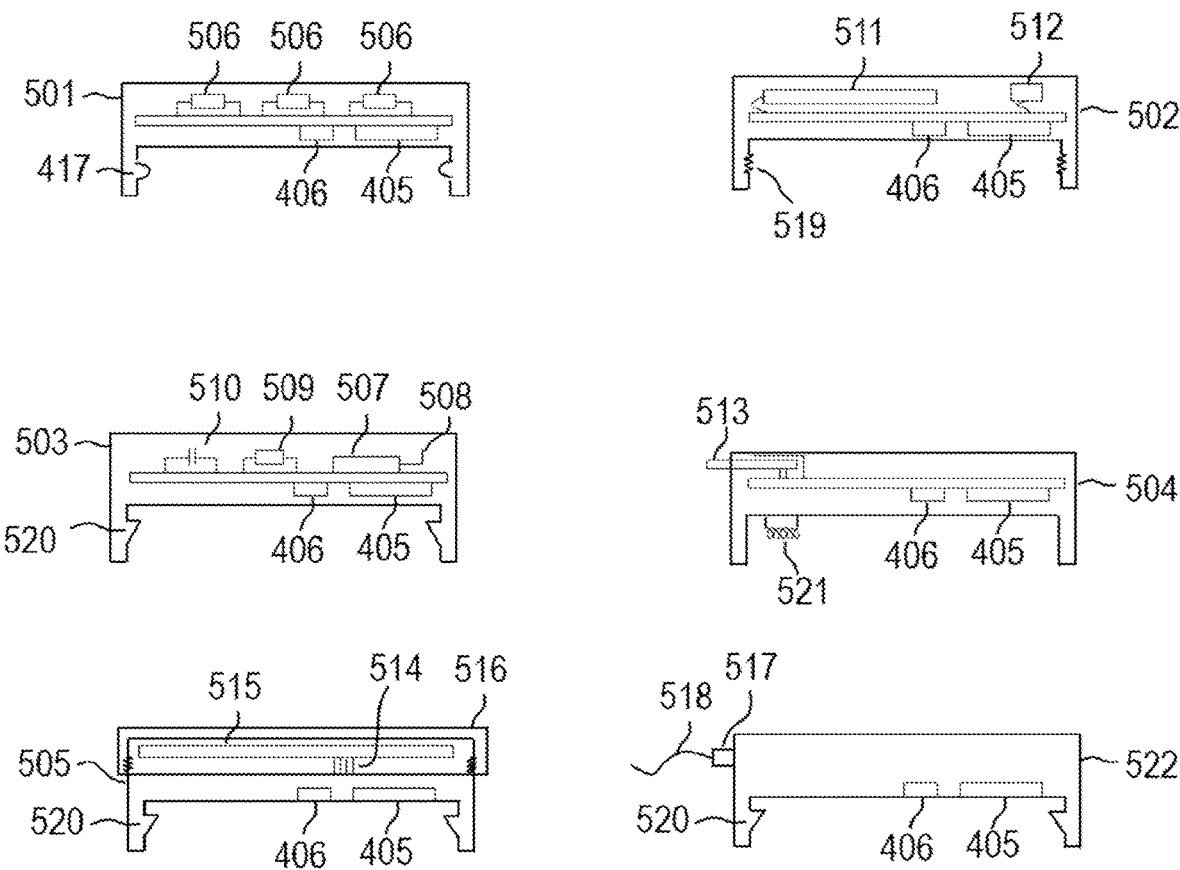

The principle of extending a basic sensor 401 with additional modules 501, 502, 503, 504, 505, 522 is further refined in FIG. 5. Common to all embodiments shown is a power transmission unit 405 and a communication unit 406.

The energy module 501 includes one or more energy storage devices 506, which are suitable for providing additional energy to a base sensor 401, thereby increasing its lifetime.

The user interface module 502 is equipped to provide on-site operation of the base sensor 401 by means of a display unit 511 and/or an input unit 512.

The communication module 503 is suitable for extending the base sensor 401 with additional wireless communication standards, for example with various low power standards such as LoRa, Sigfox, LPWAN, or also with other standards such as WLAN, GSM, 5G. For this purpose, the expansion module 503 comprises at least one communication chip 507 and an antenna 508. Depending on the design, additional energy storage 509 or energy buffers 510 are also used for short-term provision of high power.

The service module 504 may be used to create long-term records of operationally relevant data from a base sensor 401, for example using fixed or removable memory modules 513.

The adapter module 505 converts the energy and information transmitted wirelessly from the base sensor into a wired form, and makes it available at an interface 514. This interface for attaching wired supplemental modules may be a common interface, and allows for transition to common, pre-existing, supplemental modules. The wired supplemental module 515 is hermetically protected from environmental influences by a cover 516 of the adapter module 505.

Finally, the cable module 522 can be used whenever a self-sufficient basic sensor 401 subsequently needs to be supplied and/or evaluated by wire after all. For this purpose, the cable module 522 provides at least one interface 517 for connecting a cable 518, which can transmit additional power to the sensor 401 and/or can read out information such as measured values, software updates, etc., from the sensor or input such information into it from the outside.

The examples of FIG. 5 also show different examples of mechanical contours 417, 519, 520, 521 for fastening the extension module to the base sensor 401. Conceivable here is the use of threaded contours 519, snap-on contours 520 or also magnetic contours 521 or Velcro contours 521. It may also be envisaged to seal the gap 409 shown in FIG. 4 between the base sensor 401 and the extension module 403 from the outside by installing a seal in the extension module against dirt and penetrating moisture.

Figure 6:
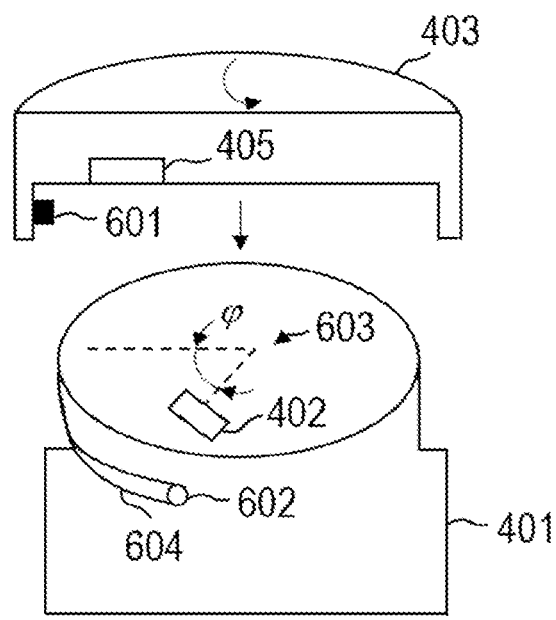

FIG. 6 shows another further development of the contours 407, 519, 520, 521. For the construction of particularly small, efficient coupling elements 402, 103, 406, 405, it is necessary that the power transmission modules 103, 405 and/or the communication modules 402, 406 are essentially opposite each other after fastening the extension module 403. This increases the efficiency of power and/or data transmission. For this reason, the extension module 403 has an angle indicator unit 601, for example a pin 601, which engages in the groove 604 during mounting of the extension module 403 on the base sensor 401. The groove forms an angle positioning unit with its end point 602 in interaction with the angle indicator 601, which ensures that the mounting angle 603 between the base sensor 401 and the extension module 403 corresponds to a predefined target angle 603.

At this point, the skilled person is aware of further mechanical devices which can ensure a predefined angular position after assembly.

Figure 7:
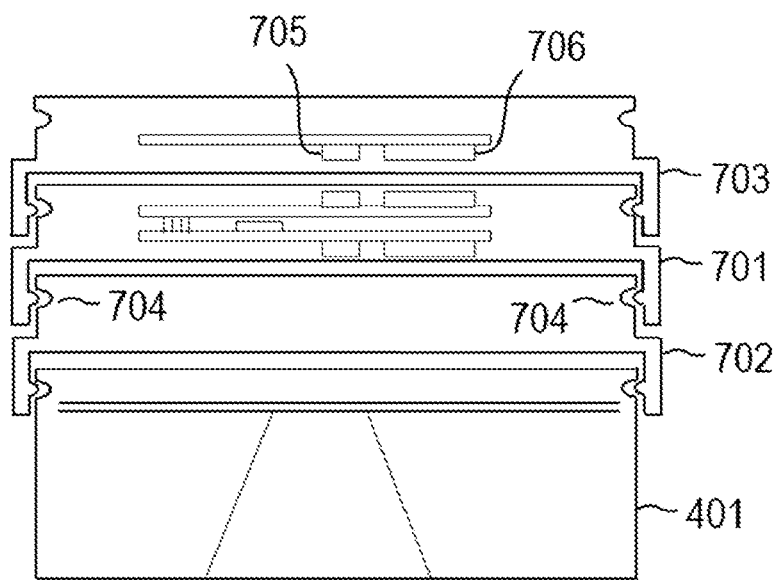

FIG. 7 shows a special embodiment of the sensor device 400 with the extension modules 701, 702, 703, with which stacking of multiple modules is achieved. Through this, the sensor base unit 401 can be expanded by several functions, whereby intermediate modules 701, 702 can each also be used as final expansion modules or final modules 703. In particular, power modules 501, communication modules 503, service modules 504 or even cable modules 522 can be used as intermediate modules. Intermediate modules 701, 702 are characterized in that, on the one hand, they have mechanical receptacles 704 for attaching further expansion modules, but also have suitable communication units 705 and/or power transmission units 706 that serve to connect further expansion modules.

In principle, all expansion modules presented so far may be used as end modules 703, in particular also the intermediate modules 701, 702. It is obvious that in particular modules with photovoltaic elements or display and control elements are primarily designed as end module 703.

The invention claimed is:

1. A base sensor for process variable determination in an industrial environment, comprising:
   process variable determination circuitry configured to sense at least one process variable independently of any expansion device;
   first wireless circuitry configured to transmit signals to a first expansion device and/or receive signals from the first expansion device;
   first wireless power transmission circuitry configured to transmit power to the first expansion device and/or receive power from the first expansion device; and
   a first housing having a first receiving device configured to receive the first expansion device or a second housing, the first housing completely enclosing the base sensor,
   wherein the process variable determination circuitry is entirely contained within the base sensor and is operable to determine the process variable without a presence of any expansion device, and
   wherein the expansion device does not include process variable determination circuitry for the at least one process variable sensed by the base sensor.

2. The base sensor of claim 1, wherein the first housing hermetically encloses the base sensor.

3. The base sensor according to claim 1, wherein the signals are measurement and/or control signals, and the first wireless circuitry is further configured to transmit and/or receive the signals as analog or digital.

4. The base sensor according to claim 1, further comprising first wireless power transmission circuitry configured to transmit power to and/or receive power from the expansion device.

5. The base sensor according to claim 4, wherein the first wireless power transmission circuit is configured to transmit and/or receive electrical power inductively or electroacoustically.

6. The expansion device according to claim 4, wherein the signals are measurement and/or control signals, and the second wireless communication circuitry is configured to transmit and/or receive the signals as analog or digital.

7. The expansion device according to claim 4, wherein the expansion device is an energy module and includes at least one energy storage device; or
   is a display and/or operating device and has a display and/or operating circuitry; or
   is external communication circuitry and has third communication circuitry; or
   is a service device and includes a data memory and memory processing circuitry, wherein the memory processing circuitry is configured to store data received at second communication circuitry and to manage the data memory; or
   is an adapter device and includes adapter circuitry configured to receive a wired sensor add-on module and to convert wireless communication with the base sensor and/or wireless power transmission from or to the base sensor into wired communication with the base sensor and/or wired power transmission from or to the base sensor; or
   is a cable device and has an interface for wired external communication and/or external power supply.

8. An expansion device for the base sensor for process variable determination in an industrial environment according to claim 1, comprising:
   second wireless communication circuitry configured to transmit signals to and/or receive signals from the base sensor; and
   a second housing having a second receiving device configured to mate with the first receiving device so that the expansion device is received by the base sensor, wherein the second housing completely encloses the expansion device.

9. The expansion device of claim 8, wherein the second housing hermetically encloses the expansion device.

10. The expansion device according to claim 8, further comprising second wireless power transmission circuitry configured to transmit power to and/or receive power from the base sensor.

11. The expansion device of claim 10, wherein the second wireless power transmission circuitry is configured to inductively transmit and/or receive electrical power.

12. The expansion device according to claim 8, wherein the second housing includes a third receiving device), configured to receive a further expansion device.

13. A sensor device comprising:
   a base sensor according to claim 1, wherein the expansion device is mounted on the base sensor.

14. The base sensor according to claim 1, wherein the process variable determination circuitry is configured to sense a pressure, a level, a limit level and/or a density as the at least one process variable.

15. A method for process variable determination in an industrial environment, comprising:
   sensing, via process variable determination circuitry, at least one process variable independently of any expansion device;
   transmitting signals, via first wireless circuitry, to a first expansion device and/or receiving signals from the first expansion device;
   transmitting power, via first wireless power transmission circuitry, to the first expansion device and/or receiving power from the first expansion device; and
   receiving, at a first housing having a first receiving device, the first expansion device or completely enclosing, by a second housing, a base sensor,
   wherein the process variable determination circuitry is entirely contained within the base sensor and the sensing further includes determining the process variable without a presence of any expansion device, and
   wherein the expansion device does not include process variable determination circuitry for the at least one process variable sensed by the base sensor.

16. A base sensor for process variable determination in an industrial environment, comprising:
   process variable determination circuitry configured to sense at least one process variable independently of any expansion device;
   first wireless circuitry configured to transmit signals to a first expansion device;
   first wireless power transmission circuitry configured to transmit power to the first expansion device; and
   a first housing having a first receiving device configured to receive the first expansion device, the first housing completely enclosing the base sensor,
   wherein the process variable determination circuitry is entirely contained within the base sensor and is operable to determine the process variable without a presence of any expansion device, and wherein the expansion device does not include process variable determination circuitry for the at least one process variable sensed by the base sensor.

\* \* \* \* \*